United States Patent [19]

Stoller

[11] Patent Number: 5,664,291

[45] Date of Patent: Sep. 9, 1997

[54] RETAINER AND HANGER FOR LENS CONTAINING DEVICES

[76] Inventor: Claude Stoller, 2816 Derby St., Berkeley, Calif. 94705

[21] Appl. No.: 506,024

[22] Filed: Jul. 24, 1995

Related U.S. Application Data

[63] Continuation-in-part of Ser. No. 428,534, Apr. 25, 1995.
[51] Int. Cl.$^6$ .............................. G02C 3/00; G02C 11/00
[52] U.S. Cl. .................... 24/3.3; 351/156; 351/123
[58] Field of Search ................................ 24/3.3, 115 G, 24/115 H, 299; 351/156–158, 123

[56] References Cited

U.S. PATENT DOCUMENTS

| | | | |
|---|---|---|---|
| 1,898,311 | 2/1933 | Boyer | 24/3.3 X |
| 2,481,946 | 9/1949 | Pendleton | 351/157 |
| 2,491,216 | 12/1949 | Schlumbohm | |
| 2,539,922 | 1/1951 | Nyberg | 351/157 |
| 2,704,961 | 3/1955 | Weil | 24/3.3 |
| 3,728,012 | 4/1973 | Downey | 351/157 |
| 4,783,164 | 11/1988 | Heiberger | 351/156 |
| 4,955,710 | 9/1990 | Meistrell | 351/156 |
| 4,976,531 | 12/1990 | Kahaney | 351/156 |
| 5,367,347 | 11/1994 | Wilson et al. | 351/156 |
| 5,475,449 | 12/1995 | Pyle | 24/3.3 X |

*Primary Examiner*—James R. Brittain
*Assistant Examiner*—Robert J. Sandy
*Attorney, Agent, or Firm*—Phillips, Moore, Lempio & Finley

[57] ABSTRACT

A retainer and hanger for lens containing devices, particularly eyeglasses, which enables eased adjustment of the vertical position of the device when suspended around the neck from a chest level position to an unobtrusive, elevated position.

2 Claims, 4 Drawing Sheets section a-a

RETAINER AND HANGER FOR LENS CONTAINING DEVICES

The present invention is a continuation-in-part of application Ser. No. 08/428,534, filed Apr. 25, 1995.

BACKGROUND OF THE INVENTION

This invention relates to retainers and hangers for eyeglasses and other lens-containing products, specifically, to those which enable the eyeglasses or other products, when not in use, to be readily adjusted from an inconvenient position near chest level to an out-of-the-way position near the neck of the user.

BACKGROUND DESCRIPTION OF THE PRIOR ART

Although a large number of persons wear eyeglasses continuously for an extended period (e.g., a substantial portion of the day), an ever-growing number of users wear eyeglasses intermittently, for limited applications such as reading, driving, viewing of television, theater or museum exhibits, sun shading, or participating in occupational or sports activities. It has become increasingly necessary for such intermittent users, given the relatively substantial expense of prescription eyeglasses and fashion sunglasses, to keep the eyeglasses securely on their person at all times. It is also desirable to keep the glasses conveniently available for immediate use, and in some applications, particularly in occupational and sports activities, to have the eyeglasses held snugly against the face when in use.

There have been numerous eyeglass hanger and eyeglass retainer products previously described or used. Representative patents covering such products include the following:

U.S. Pat. No. 2,491,216 to Schlumbohm (1949) is directed to a mechanical eye shielding device (not including lenses) that could be shifted from one retention position to a second position by means of strings. U.S. Pat. No. 2,798,409 to Speers (1957) discloses a ribbon hanging support for eyeglasses and requires specifically designed eyeglass temples, or an adaptor for use with more conventional eyeglass temples which have rectangular sectional configurations. There is no adjustment of the position of the eyeglasses once suspended from around the neck other than manually placing the eyeglasses on the users' ears.

U.S. Pat. No. 2,539,922 to Nyberg (1951) discloses an eyeglass retainer strap which can be adapted to fasten behind the ear on various eyeglass temple types or alternatively to suspend or hang the eyeglasses from around the users' neck. The eyeglass strap combination does not enable snug retention of the eyeglass nor adjustment of the position of the eyeglasses once hanging from the neck.

U.S. Pat. No. 2,660,092 to Bloom (1953) is directed to a snug retainer which requires a special design for the eyeglass frames and eliminates the temples entirely. The device is not applicable to conventional eyeglasses.

U.S. Pat. No. 3,728,012 to Downey (1973) provides snug retention of eyeglasses when used and loose suspension of them around the neck when not in use. The snug retention Is achieved due to high friction between a plastic monofilament retainer strand and the walls of tapered holes in the temples through which they pass, the holes having a greater diameter at the surface of the temples, and being constricted at the center. The device is not suited to eased adjustment of the suspended eyeglasses from chest level to a more convenient location near the neck since it requires, in light of the high coefficient of friction of the filament, two hands to move the filament through the hole at each temple. A further disadvantage of the assembly is the discomfort to the wearer in the locations where the stiff monofilament strand emerges from the insides of the temples. Even the minimum possible radius of the bend in the monofilament would cause it to press against the head of the wearer, and its stiffness would cause it to project straight out from the temples and interfere with long hair.

U.S. Pat. No. 3,827,790 to Wenzel (1974) and U.S. Pat. No. 4,603,951 to Beck et al. (1986) disclose devices for fastening an elastic retainer to the temples of a pair of eyeglasses, but do not enable a simple adjustment of the length of the suspended eyeglasses from an inconvenient position near the chest of the user.

U.S. Pat. No. 4,761,068 to Star (1988) is directed to an eyeglass retainer which enables quick release from the eyeglasses of self-engaging straps.

U.S. Pat. No. 4,790,646 to S. V. Seron (1988), U.S. Pat. No. 4,974,956 to Gill (1990), U.S. Pat. No. 4,955,710 to Meistrell (1990), and U.S. Pat. No. 4,976,531 to Kahaney (1990) are each directed to eyeglass-retainer combinations that allow suspension of the eyeglass from the neck but do not enable eased adjustment of the suspended eyeglasses from an inconvenient chest level position to an "out-of-the-way" position near the neck.

Eyeglasses, when unnecessary for use and suspended from the neck to a position near chest level, are frequently in the way when the wearer is eating at a table, fastening automobile over-the-shoulder safety straps and seat belts, or performing tasks that require bending. In the case of automobile use, dangling eyeglasses caught in the web of seat belt straps are not conveniently freed when use is desired. Women may also find dangling eyeglasses particularly uncomfortable when fully suspended to a position near breast level.

Moreover, when eyeglasses or sunglasses are used in conjunction with other devices suspended around the neck such as binoculars or cameras, it is of great convenience to be able to hang the eyeglasses at a different level than, and out of conflict with, the other device.

None of the foregoing references address the problem accompanying the suspension of eyeglasses at an inconvenient position near the chest. Conventional eyeglass retainers and hangers do not enable a rapid and simple adjustment of the suspended eyeglasses to a less obtrusive position. With conventional assemblies, the slower and more tedious means for adjustment to a less obtrusive position is not likely to be used, the wearer simply not bothering to do so.

OBJECTS AND ADVANTAGES OF THE PRESENT INVENTION

It is an object of the present invention to overcome the disadvantages in the prior art mentioned above to make available a simple, affordable assembly that will allow eyeglasses or other lens-containing devices, when not in use, to hang freely from around the neck, and to provide instant and easy adjustability in order to raise the eyeglasses or other devices from a hanging position near chest level of the wearer to a less obtrusive position under the chin.

It is a further object of the present invention to provide in an assembly described above snug retention of the eyeglasses against the face and an instant and easy release of the eyeglasses from the snug retention position to a pendant position.

It is yet a further object of this invention to provide a kit that will enable a professional shop (i.e., optometrist or eyeglass dealer) easily to fit a pair of conventional eyeglasses with the above-described assembly, or to provide a kit that will enable a consumer end-user to easily fit said conventional eyeglasses with said above-described assembly.

It is an even further object of this invention to provide adaptability so that the foregoing assembly can be attached to the temples at a position on the temple in front of or behind the ears when the eyeglasses are worn, and to provide comfort and convenience to the user, and to provide ease of storage of the assembly in conventional storage containers.

Figure 1:
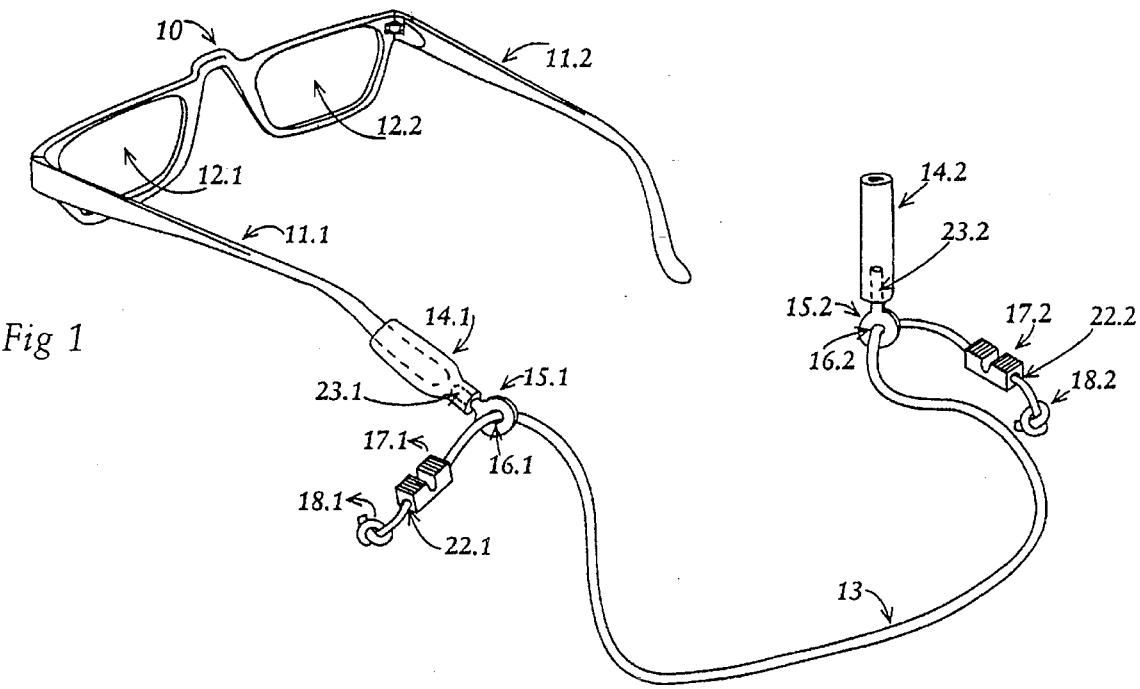
FIG. 1 is a perspective view showing a device in accordance with the invention which is mounted to eyeglass temples using stretchable gripping tubes.

REFERENCE NUMERALS IN THE DRAWINGS 10 eyeglass frame
11 temple
12 eyeglass lens
13 strand for hanging or retaining
14 stretchable gripping tube of temple extender
15 solid portion of temple extender
16 hole for strand in temple extender
17 friction block
18 knot in strand end
19 hole for strand in temple
20 wide temple
21 hole for strand in wide temple
22 friction block hole

REFERENCE NUMERALS IN THE DRAWINGS 10 eyeglass frame
11 temple
11.1 left temple
11.2 right temple
12.1 left eyeglass lens
12.2 right eyeglass lens
13 strand for hanging or retaining
13.1 left strand end
13.2 right strand end
14.1 stretchable gripping tube of left temple extender
14.2 stretchable gripping tube of right temple extender
15.1 solid portion of left temple extender
15.2 solid portion of right temple extender
16.1 hole for strand in left temple extender
16.2 hole for strand in right temple extender
17 friction block
17.1 left friction block
17.2 right friction block
18 knot in strand end
18.1 knot in left strand end
18.2 knot in right strand end
19 hole for strand in temple
19.1 hole for strand in left temple
19.2 hole for strand in right temple
20.1 wide left temple
20.2 wide right temple
21.1 hole for strand in wide left temple
21.2 hole for strand in wide right temple
22 friction block hole
22.1 hole in left friction block
22.2 hole in right friction block
23.1 stem of left ring member
23.2 stem of right ring member
24.1 left elongated tube with opening for strand
24.2 right elongated tube with opening for strand
25.1 opening for strand in left elongated tube
25.2 opening for strand in right elongated tube With regard to FIGS. 1, 2, 3, and 10, each feature of the retainer and hanger for lens containing devices is identified by a particular number followed by the designation "0.1" where the feature is on the left side thereof and "0.2" where the feature is on the right side thereof. The reference numbers set forth below to indicate particular features do not include the left and right side designations but should be understood to apply to both the left and right sides of the retainer and hanger for lens containing devices in all instances where said features occur on both the left and right sides thereof.

DETAILED DESCRIPTION OF THE PREFERRED EMBODIMENTS

Referring in greater detail to FIG. 1, a device according to the present invention is shown, said device including temple extender tube 14, which the end user slidably mounts on the temple 11 of conventional eyeglass frame 10, said tube 14 comprised of rubber, neoprene or like material, and attached to cylindrical stem 23 of ring member 15. Strand 13, having knots 18 at either end thereof, extends through each hole 16 of each ring 15, as well as holes 22 of friction block members 17.

Figure 11:
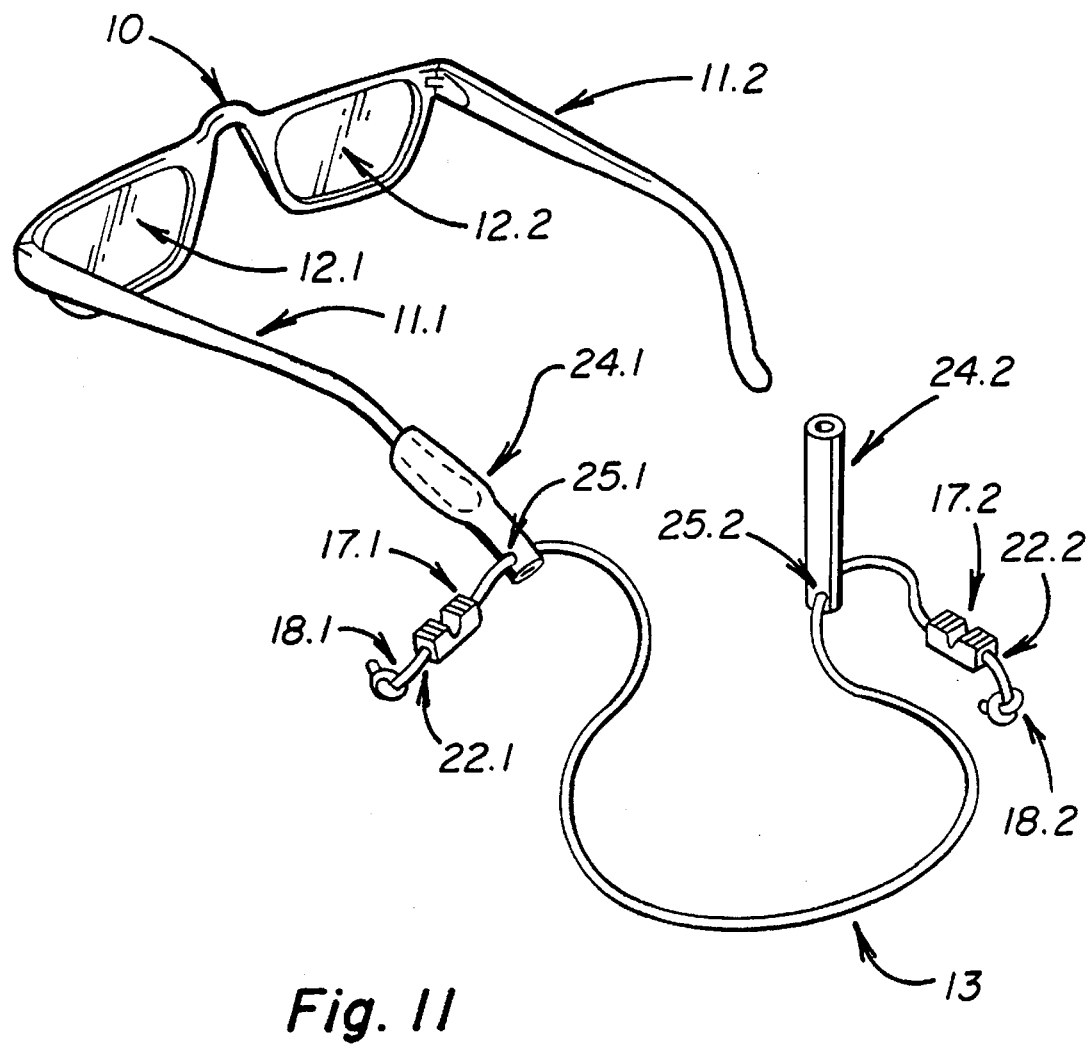
FIG. 11 is a perspective view showing a device in accordance with the invention which is mounted to eyeglass temples using elongated tubes with openings enabling a strand to pass therethrough.

Alternatively, as shown in FIG. 11, strand 13 may extend through an opening 25 in each elongated tube 24 slidably mounted on each temple of the eyeglass frame. The opening in the elongated tube may be reinforced with rivets or other reinforcing means.

Figure 2:
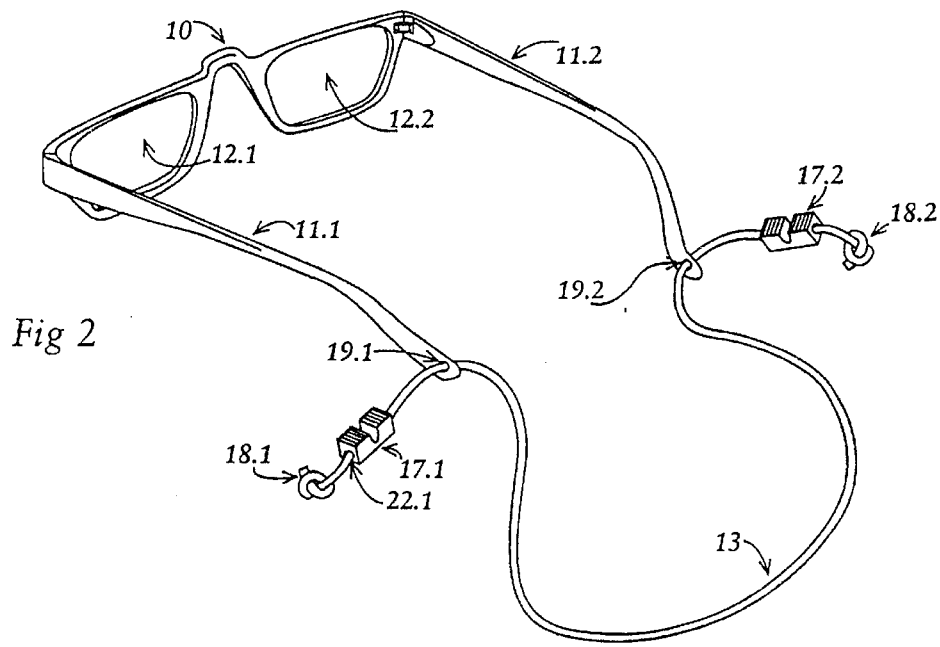
FIG. 2 is a perspective view showing a device in accordance with the invention which is fastened to the eyeglasses by drilling holes in the temples and threading a strand therethrough.

Referring to FIG. 2, the temple extender tube and ring member assembly shown in FIG. 1 is eliminated, and strand 13 extends directly through opening 19 in each eyeglass temple drilled by a professional shop.

Figure 3:
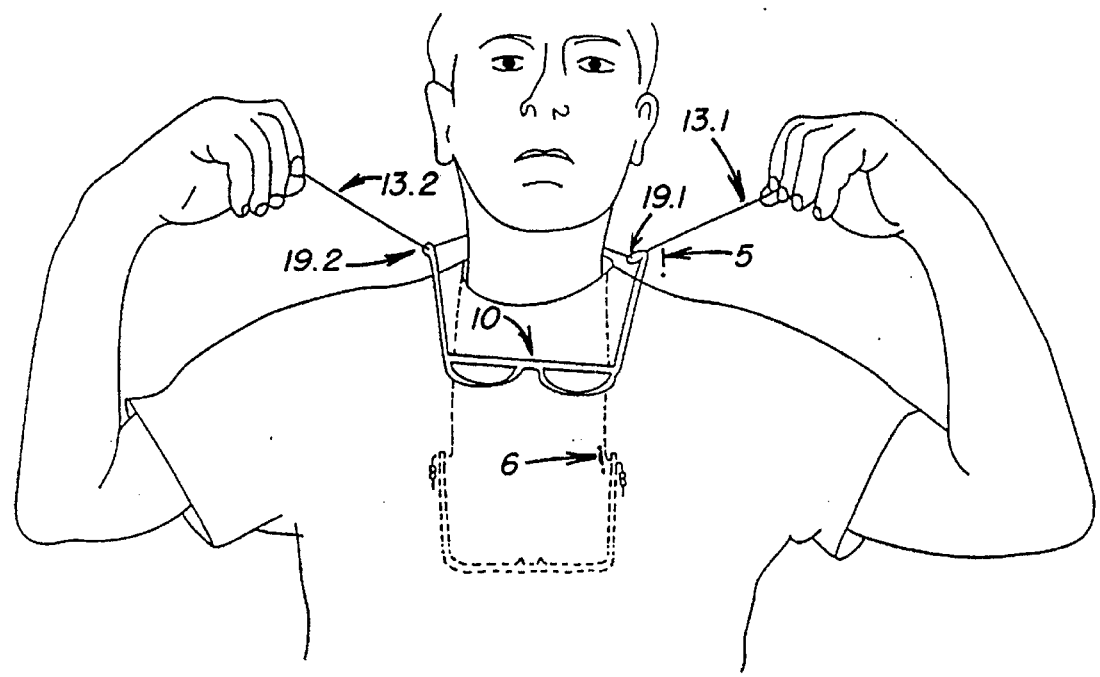
FIG. 3 is a front view of a person wearing a device in accordance with the invention, showing elevation of the eyeglasses from a suspended position near chest level (shown dotted) to an elevated under-the-chin position, which is achieved by pulling laterally the ends of the strands of said device.

Referring to FIG. 3, eyeglasses 10 may be raised from the lower suspended position near chest level (shown dotted) to a higher position, as high as just under the chin, by pulling the strand end knots laterally and then releasing the strand when the desired elevation is reached. The vertical position of the eyeglasses may be lowered by pulling downward on the eyeglasses, until a desired level is attained.

Strand 13 comprises a material that has sufficient surface texture to produce enough friction with the holes in a temple or temple extender through which it passes, to support the weight of the eyeglasses or other lens device. Additionally, the strand should provide minimal friction when it is pulled through the holes in the temple itself, the ring member-extender tube assembly attached thereto, or the extender tube. The diameter of the hole in the temple, ring member or extender tube should be sufficiently greater than that of the strand to minimize friction when the eyeglasses, as suspended from the neck, are in the process of being elevated from a chest-level position to a position near the neck or chin. The material must also allow sufficient friction with hole 16 to prevent the eyeglasses from sliding down the strand when the eyeglasses are retracted to an elevated position above chest level, yet be limp enough to hang straight down.

Figure 5:
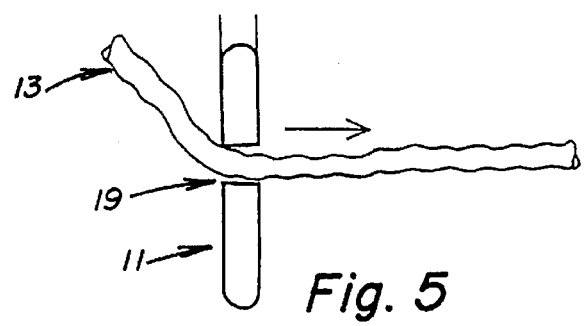
FIG. 5 is an enlarged sectional view of a strand of a device in accordance with the invention, said strand extending through a hole in a temple in or a temple extender attached to the eyeglasses as said strand is being drawn through said hole by a lateral pull (as shown in FIG. 3) exerted in order to raise the eyeglasses from a lower to a higher level.
Figure 6:
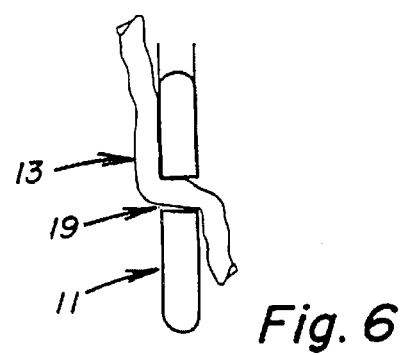
FIG. 6 is an enlarged sectional view of a strand of a device in accordance with the invention, said strand extending through a hole in a temple in or temple extender attached to the eyeglasses as the lateral pull on said strand (shown in FIG. 3) is released and its friction against said hole in said temple or temple extender is increased by virtue of the extra bends in said strand caused by its limpness and by the gravitational pull on said eyeglasses and the gravitational pull on the loose end of said strand.

Referring to FIGS. 5 and 6, the different orientations of strand 13 and the opening in the temple (or the ring member-extender tube assembly) are shown. In FIG. 5, the lateral pulling of the strand by the wearer (as shown in FIG. 3) achieves eased elevation of the suspended eyeglasses due to minimal friction between the strand and the temple hole. In FIG. 6, when lateral movement is ceased and the strand is released by the wearer, the surface texture of the strand brings about sufficient friction to maintain the eyeglasses at the desired elevated level. When devices, e.g., cameras or binoculars, are used, the friction must be increased to support the heavier device at a desired elevated level. With heavier devices, e.g., cameras, binoculars, telescopes and other optical viewing, recording, or measuring devices, the strand should be sufficiently strong and textured to enable the rapid elevation of the device from a chest level position to a less obtrusive position under the neck. For those objects, the strand passes through a ring member attached to each side of the object, the strand similarly oriented relative to the ring member holes, as in the temple holes depicted in FIGS. 5 and 6, for the lateral pull and release steps, respectively.

Preferably, strand 13 is a braided, knitted or woven strand, lacing or piping made from plastic fibers such as nylon or natural fibers such as silk or rayon. Other materials such as leather, textile fabrics, fine chains of metal or plastic are also suitable so long as the foregoing friction, surface texture and limpness objectives are met. The shape of the strand may be generally cylindrical, ribbon or strap shaped so long as the recited friction objectives and compatibility with suitable friction block clamping members are achieved. Composite materials, such as very thin metal wires or ribbons braided around cores of textile fibers, leather and other materials are also suitable.

Ring member 15 including stem 23 may be plastic, metal or any suitable material that allows bonding by glue or mechanical means such as retaining rings or clamps, to extender tube 14.

Figure 4:
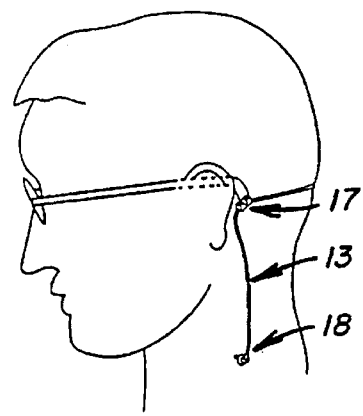
FIG. 4 is a side view showing a device in accordance with the invention where the eyeglasses are snugly retained against the face of the wearer by the retainer, with clamping members maintaining the tension of the strand around the wearer's head.
Figure 7:
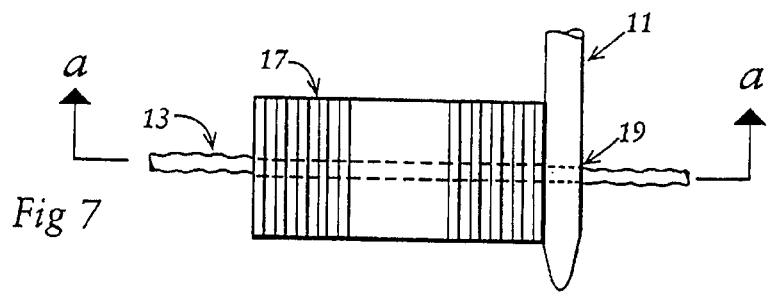
FIG. 7 is a plan view showing a rubber friction block device in accordance with the invention which contains a longitudinal passage through which the strand of the invention is threaded, the configuration of said passage being curved in such a manner as to increase friction and prevent eased movement of said strand through passage.
Figure 8:
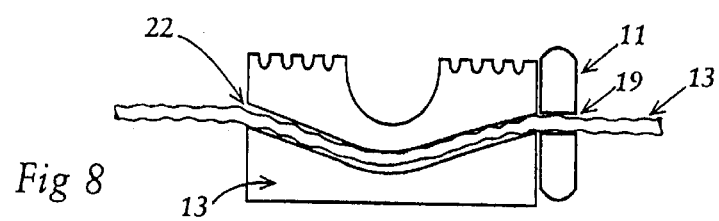
FIG. 8 shows a vertical section through the said rubber friction block device.
Figure 9:
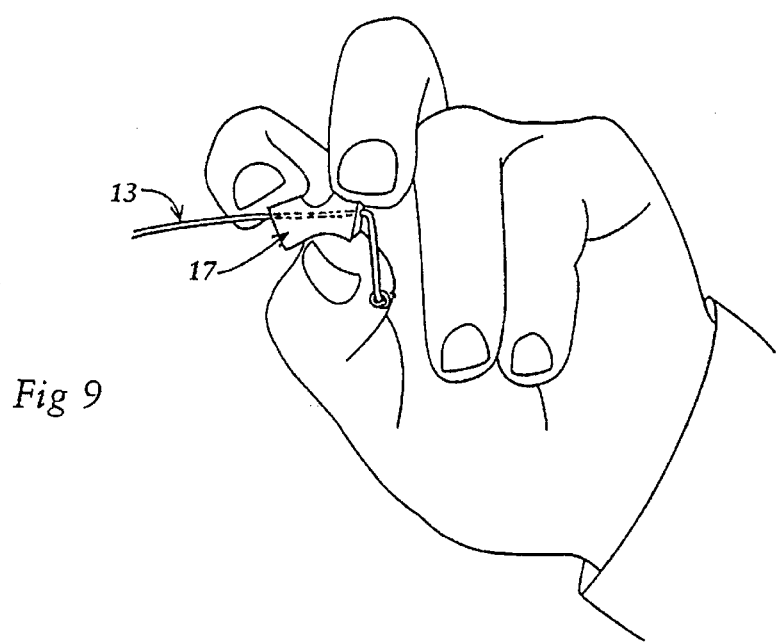
FIG. 9 is an enlarged sectional view showing the application of pressure by a wearer's fingers on the said rubber friction block device in such a manner as to straighten the passageway through which the said strand is threaded, thereby lowering the friction between said friction block and said strand, thus allowing said friction block to be moved easily along said strand so that the tension in said strand may be released.

Referring to FIGS. 7, 8 and 9, when the eyeglasses are to be secured tightly against the face of the wearer, the ends of the strand 13 are pulled laterally to tighten the strand around the head. The passageway in the friction blocks 17 are straightened by applying pressure to the friction blocks as shown in FIG. 9 to allow the blocks to be moved into place just outside the holes. As shown in FIG. 4, the friction blocks are tightened in such a way as to maintain the tension in the strand passing around in back of the wearer's head and to hold the eyeglasses snug against the wearer's face. To release the tension of the strand around the wearer's head and restore the eyeglasses to a hanging position on the strand, the friction blocks are moved laterally towards the ends of the strand as shown in FIG. 9 and the temples pulled forward.

A variety of friction blocks can be used, most preferably an elastomeric material, soft rubber, plastic, or cork surrounding the strand in such a configuration as shown in FIG. 9. The block may also be in the shape of a ball or other solid shape so long as the hole therethrough is small enough to produce relatively high friction between the block and the strand. In a preferred embodiment, the block shown in FIGS. 1 and 2 may be used because the clamping pressure can be released easily and instantly by the user with one hand at each temple to change the eyeglass position. Cork used for the friction block has the advantage of rendering the eyeglasses buoyant should they be dropped in the water. The ends of the strand 13 are knotted with a simple knot 18, the placement of which determines the vertical position of the eyeglasses when fully suspended from the neck. The knots can be tied and readjusted by the user to vary the level of the maximum suspension.

Figure 10:
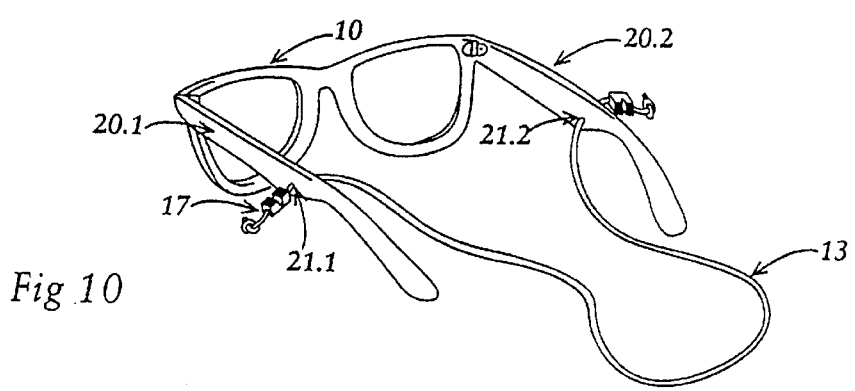
FIG. 10 is a perspective view showing a device in accordance with the invention which is fastened to eyeglasses having widened temples at a position in front of the ears of the wearer when said eyeglasses are worn, and holes in said widened portions enabling a strand to pass therethrough.

FIG. 10 shows an eyeglass temple of the wider kind 20, with a hole 21 to accept the device as in FIG. 2. The same constraints of the relationship of strand diameter and texture, and hole diameter, apply as in FIGS. 1 and 2.

The present invention may be installed on temples as shown in FIG. 10 by having the temple hole at a position in front or behind the wearer's ears, when worn. It is also intended that devices similar to the temple extender 14, 15 and 16 of this invention (FIG. 1) may be applied to the widened temples at a position in front of or behind the wearer's ears when the eyeglasses are worn.

While the invention has been described with respect to specific embodiments thereof, it is to be understood that other modifications and changes may be made to the disclosed embodiments without departing from the spirit and scope of the invention as defined by the following claims.

What is claimed is:

1. An eyeglass hanger and retainer comprising a strand having opposite end portions that extend through openings in first and second elongated tubes, each elongated tube slidably mounted on an end of each temple of a pair of eyeglasses, each of said openings being of a diameter sufficiently greater than the diameter of the strand so that the strand slides through the openings readily without significant friction when the opposite ends of the strand are pulled laterally by the eyeglass wearer; said strand being adjustable from a position around the back of the head of the wearer that allows snug retention of the eyeglasses firmly in front of the eyes of the wearer, to a pendent position around the neck of the wearer, the position of the eyeglasses when the strand is around the neck of the wearer being readily adjusted to an elevated position by laterally pulling the opposite end portions of said strand, and readily adjusted to a lower position by pulling downward on the eyeglasses.

2. The eyeglass hanger and retainer of claim 1 wherein said opposite end portions of the strand each have a knot to prevent said end portions from passing through said elongated tube openings or said clamping members.

* * * * *